Feb. 28, 1956

C. A. BOSSERMAN 2,736,521

FLEXIBLE TANK WALL EDGE SEALS

Filed April 13, 1954

INVENTOR.
CHARLES A. BOSSERMAN
BY
Reynolds, Beach & Christensen
ATTORNEYS

United States Patent Office 2,736,521
Patented Feb. 28, 1956

2,736,521

FLEXIBLE TANK WALL EDGE SEALS

Charles A. Bosserman, Seattle, Wash., assignor to Boeing Airplane Company, Seattle, Wash., a corporation of Delaware Application April 13, 1954, Serial No. 422,739

17 Claims. (Cl. 244—135)

This invention relates to the problem of sealing the edges of the wall portions of flexible tank sections, such as are used to make up tanks for fuel or oil in airplanes, to airplane structural elements, such as ribs or bulkheads, by which the sections are supported and held in distended form. In general this invention deals with the same problem as is dealt with in the copending application of Tatom et al., Serial No. 145,166, filed February 20, 1950.

In the Tatom et al. construction, and in all others of which I have any knowledge, of the same general nature, it has been attempted to effect a liquid-tight seal, and at the same time to resist tensional forces tending to break the securement of the tank section's edge from the supporting structure, by means of a single bead formed around the edge of the wall, and held in place relative to the supporting structure by retainer elements engaging behind the bead. Difficulties have been encountered, however, with such constructions. From the very nature of the liquid-tight sealing which is required, some deformability is required in the joint, and usually is provided by making the bead somewhat deformable. On the other hand, mechanical integrity of the joint against tensional pulls is defeated by appreciable deformability of the bead which is depended upon for retention of this mechanical integrity. In attempting to achieve these two and somewhat antithetical objectives, neither has been fully achieved by the constructions employed heretofore.

According to the present invention two separate means, in the form of beads, are provided for accomplishing each its individual function, namely, the one, the function of resisting tensional forces tending to pull the wall's edge from the structure, and the other, the function of effecting a liquid-tight seal. The tensional resisting arrangement is so related to the liquid-tight sealing arrangement that the tensional forces are not imposed upon, and hence do not affect the integrity of, the liquid-tight seal, and, conversely, the liquid-tight seal is permitted to effectuate its purposes by a constructional arrangement peculiarly adapted thereto, and to do so without weakening the integrity of the tensional resisting construction.

In addition to the general object outlined above it is among the objects of the present invention to provide a joint capable of accomplishing the primary end, and in itself simple, both in construction and in assembly, and a construction which, whenever necessary, can be readily disassembled and reassembled in operative condition.

Other objects, and particularly such as relate more peculiarly to structural details, will become apparent as this specification progresses.

In the accompanying drawings the invention is shown embodied in an illustrative form, it being understood that various changes may be made in the form, arrangement and individual characteristics of the parts of the invention without departing from the spirit thereof, all as will appear more fully hereinafter.

Such tanks, which are well known in their general characteristics, are made up by joining separate sleeve-like or bag-like sections of flexible or pliant liquid-proof sheet material, along their edges, to rigid bulkhead elements, to define a multibay or multisection flexible tank, housed within the airplane skin or the like, which is also supported on the bulkhead members. For example, the bulkhead members are usually the chordally directed ribs of a wing structure, and the tank becomes a wing tank. Often, and particularly in military airplanes, the sheet material of which the tank sections are made is in the form of a sandwich consisting of two outer plies of rubber-like sheet material, neoprene or the like, enclosing between them a sealant ply, which may be an unvulcanized rubber composition or the like. Such sheet material is disclosed herein in the detail views, and the present invention is especially designed to function in conjunction with such sheet material, but the employment of that particular type of sheet material is not essential to the functioning of the present invention.

Figure 1:
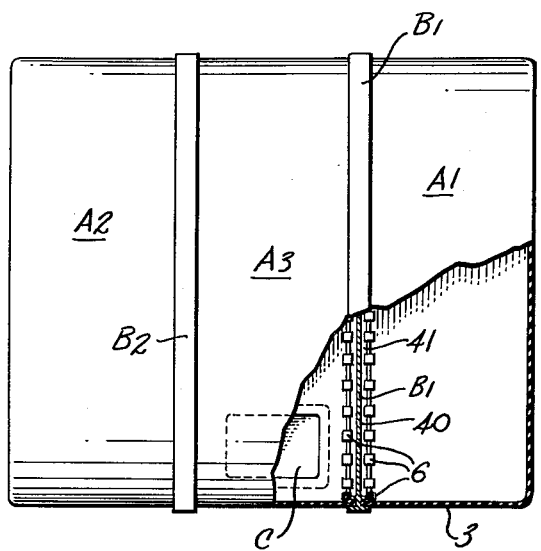
Figure 1 is a general plan view, with parts broken away, illustrating such a fuel tank with parts in the assembled relationship.
Figure 2:
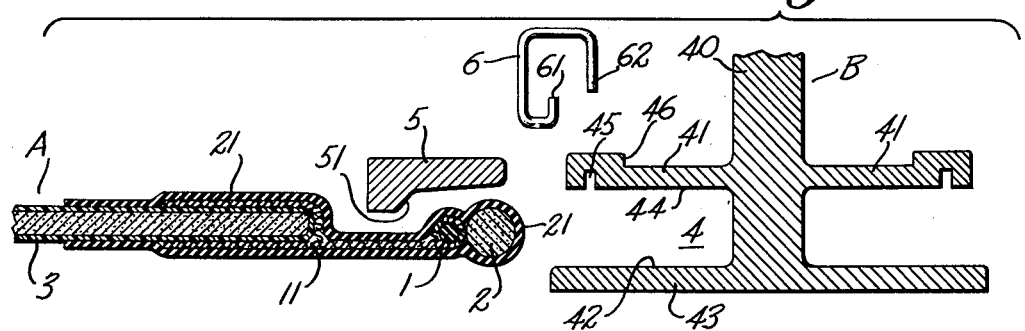
Figure 2 is a transverse sectional detail, to a greatly enlarged scale, through an individual joint, illustrating parts disassembled, but in general in the relationship which they will assume upon assembly.

In general, then, the tank shown in Figure 1 consists of two end sections A1 and A2 of bag-like form, closed at their outer ends and open at their inner ends, and an intermediate section A3, representative of any number of such intermediate sections, which is open at both ends, and therefore is of sleeve-like form. These several tank sections are disposed with the edges of their walls at the open ends adjoining bulkheads B1 and B2, which are the supporting structural members, such as the wing rib structure, sometimes called wing bulkheads, just as in the Tatom et al. application. These bulkheads are apertured to the extent necessary for communication and venting between sections in their individual bays, and usually also for passage of a workman through the bulkheads, so that he may have access to the several compartments of the tank. Entrance to the tank may be secured through a manhole C in one of the tank sections. Where it is immaterial, as in the discussion of the detail views, which particular bulkhead or tank section is employed, the identifying letters will be used without suffixes.

Each edge of each tank section is provided with two separate beads, which extend entirely about the edge, and which lie preferably both in the same general plane as the tank wall, that is to say, in extension of that wall. One of these beads 1 is defined primarily by a hard, substantially incompressible core, which may be a metal rod, or of hard plastic, or a wire cable, or some similar material. The second such bead, shown at 2, is of soft, resiliently deformable material, as, for instance, soft rubber or rubber composition. These are suitably secured to the edge of the sheet material 3, preferably but not essentially with the hard-cored bead 1 somewhat inwardly from the soft-cored bead 2. Their securement may be effected, for example, by encircling the hard core 1 with a fabric-reinforced tape 11, the opposite edges of which span the edge of the sheet 3 and are adhered to its opposite faces, after which the soft core 2 is enclosed within a rubber-like strip 21, which also overlies the bead 1 and the tape 11, and is itself bonded to the opposite faces of the sheet material 3. This strip 21 should be liquid-proof, that is, impervious to and not affected by the liquid, such as gasoline, which is intended to be received within the tank.

It has been stated above that it is not essential which side of the soft-cored bead 2 the hard-cored bead 1 is placed. It will be observed that the hard core 1 is smaller than the soft core 2, and this is preferable, but again this is not essential so long as the soft bead 2 is of such size and so located with respect to the remainder of the joint as to be resiliently deformed by the operation of making the joint secure. The preferred arrangement employs a larger soft-cored bead 2, outwardly of the smaller hard-cored bead 1.

Each bulkhead B is formed, along a line coinciding with the beaded edge of the tank sections which are to be joined thereto, with a reasonably deep groove 4. To this end it may be provided with a reaction means such as the flange 41 outstanding from the web 40 of the bulkhead, the inner face 44 of which flange is spaced from a facing wall 42 by a suitable distance. This wall 42 may itself be a wall of a flange 43 which generally parallels the flange 41. In addition it is preferred that the inner face 44 of the flange 41 be provided with a recess 45 at an abrupt angle with respect to the face 44, and that the flange 41 be exteriorly provided with a shoulder 46 facing away from the outer edge of the flange.

Preferably the groove 4 is of a depth to receive the beads 1 and 2, with some space to spare transversely of the groove. On the other hand, the shape of the groove might in itself be such as will effect some deformation of the soft core 2. Such deformation is preferably effected, however, by means of a filler bar 5, which is inserted within the groove 4 in contact with the face 44 and alongside the beads, and by its insertion it effects deformation of the soft bead 2. It may or may not be slightly tapered in cross section, to this end. Additionally, at its outer edge the filler bar 5 is flanged to define a shoulder 51, which, in relation to the thickness of the hard bead 1 and the width and depth of the groove 4, engages behind this bead 1 and narrows down the effective width of the groove at the flange of the filler bar, and behind the bead 1, to an extent such that the filler bar constitutes a retaining means for the hard bead, and the latter is retained and may not be pulled out between the flange of the filler bar and the opposite face 42 of the groove.

The tank sections A are assembled to the bulkheads B by inserting the beaded edge of the pliant sheet material 3, which constitutes the wall of the tank section, into the appropriate groove 4, and then inserting the filler block 5 alongside the beads to crowd and deform the sealing bead 2, and to engage behind the hard retained bead 1. The filler bar 5, which it is understood fills the entire length of the groove, and is suitably shaped to this end, is held in its retaining position by suitable means, preferably means which are readily removable, but which will strongly resist removal under tension. Spring clips 6 may be employed at intervals to this end, these clips having a foot 61 which is engageable within the recess 45, and a foot 62 which is engageable behind the shoulder 46. When so engaged, as seen in Figure 3, that portion of the clip 6 which lies within the groove 4 engages behind the filler block 5, and these clips collectively very strongly prevent pulling out of the filler block, yet they are readily engaged or disengaged when such is necessary by workmen from within the tank.

Figure 4:
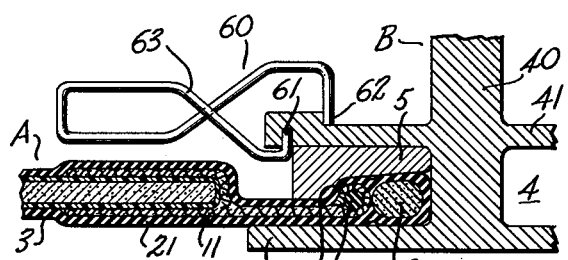
Figure 4 is a view similar to Figure 3, showing a slightly different form of retaining clip.

An alternative form of spring clip is illustrated in Figure 4. Here the clip 60 still has the feet 61 and 62, but intermediate them is crossed at 63 to provide greater flexibility, and thereby to make easier the engagement or disengagement of the clips.

Figure 3:
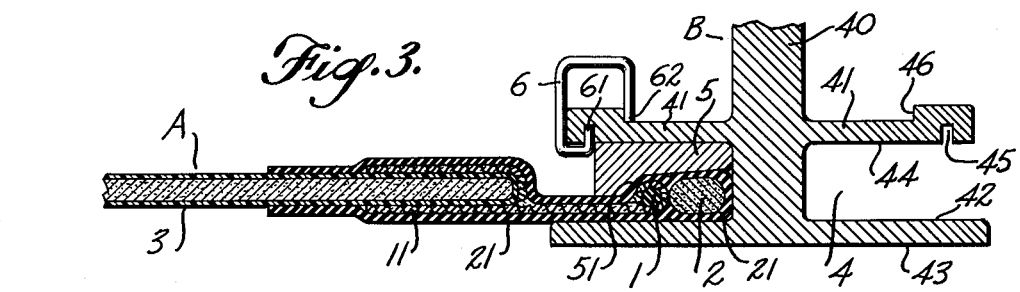
Figure 3 is a similar view showing parts assembled.

When the structure is assembled, as described and as shown in Figures 3 and 4 in detail, it is clear that any tensional force on the wall 3, even an abrupt force such as might be caused, for example, by the impact of a bullet or shell fragment, will be resisted primarily by the reaction between the hard bead 1 and the shoulder 51 of the filler block 5. It will require rupture of the sheet material 3 to pull the edge of the tank section A away from its bulkhead B, and the fabric-reinforced tape 11 may be made of sufficient strength that this is very unlikely to occur intermediate the bead 1 and the edge of the sheet material 3. Should any such tensional force be applied to the sheet material 3, and be resisted by the hard bead 1, it will not affect the soft bead 2, but this will continue at all times by its deformation to effect a liquid-tight seal. Nevertheless the joint is readily disengageable simply by disengaging the clip 6 or 60 from the bulkhead B, whereupon a pull on the pliant sheet material 3 will pull the filler bar 5, along with the beads 1 and 2, out of the groove 3. Reassembly is equally simply effected.

I claim as my invention:

1. Means detachably edge-securing and sealing a pliant sheet, such as an internal wing fuel tank section, to a support structure, such as the wing bulkhead structure of an airplane, comprising two separate beads formed continuously along and in general extension of the edge of the pliant sheet, one bead being of relatively soft, resiliently deformable material, for sealing, and the other bead being of relatively hard and nondeformable material, for securement; the support structure having a substantially continuous groove of a width greater than the thickness of the harder, securing bead, and of a depth to receive, and receiving, both said beads, a filler bar of substantially noncompressible material received within and extending the length of the groove, said filler bar having a cross-section substantially filling the width of the groove alongside the harder bead, and crowding and deforming the softer sealing bead, said filler bar having a longitudinally extending flange located, by the bar's reception within the groove, in contact with the outer side of the harder securing bead, preventing withdrawal thereof, and means mounted upon the support structure and removably engaged with the filler bar, retaining it in such engagement with the beads and within the groove.

2. Means as and for the purpose stated in claim 1, wherein the harder bead is inwardly of the pliant sheet's edge, relative to the softer bead, whereby tension in the sheet is resisted by the harder securing bead and the filler bar, and the softer sealing bead acts, substantially, only as a sealing means.

3. Means as and for the purpose stated in claim 1, wherein the softer sealing bead is thicker, transversely of the groove, than the harder securing bead, and the filler bar being of a cross-sectional shape, in the vicinity of its portion which engages said sealing bead, to flatten and elongate the latter while the filler bar is received and retained within the groove.

4. Means as and for the purpose stated in claim 1, wherein the softer sealing bead is located outwardly of the harder securing bead, towards the sheet's edge, and is of greater thickness, transversely of the groove, the groove being of a width to receive, without deforming, the softer bead, and the filler bar has a cross-section to flatten and elongate said softer bead as the bar enters the groove, and to maintain it so flattened while the bar is received and retained within the groove.

5. Means as and for the purpose stated in claim 1, wherein the retaining means includes a plurality of spring clips spaced along and engageable with the supporting structure, and when so engaged extending in part at least across the groove's entrance, behind the filler bar.

6. Means as and for the purpose stated in claim 1, wherein the supporting structure is formed with a flange and a facing portion spaced therefrom, together defining the groove, and said flange is recessed within the groove, and is formed with an exterior shoulder facing away from the groove's entrance, and a plurality of spring clips spaced along said recessed and shouldered flange, each having an end received in the recess and another end engaged behind the shoulder, to constitute the filler bar engaging and retaining means.

7. A removable tank section for internal wing fuel tanks or the like, in an airplane, comprising a tubular tank section of liquid-proof pliant sheet material having at least one open end the edge of which is to be secured to and sealed with respect to a wing structural member such as a bulkhead, two beads extending continuously along said edge, both in general extension of the sheet material, in general parallelism, and located one outwardly of the other, and both being of a thickness materially in excess of the adjoining tank section sheet material total thickness, one of said beads being of hard, substantially nondeformable material, for engagement with the structural member and retention by suitable retaining means, and the other being of softer, resiliently deformable material, for sealing contact alone with the structural member.

8. A removable and beaded tank section as defined in claim 7, wherein the sealing bead is located nearer the edge of the sheet material than the retaining bead.

9. A removable and beaded tank section as defined in claim 8, wherein the sealing bead is thicker, transversely of the plane of the sheet material, than the retaining bead.

10. A removable and beaded tank section as defined in claim 7, wherein the pliant sheet material is of impervious nature, and the retaining bead is formed as an incompressible rod, a fabric-reinforced tape enclosing the same and having its edges secured to the opposite faces at the edges of the sheet material, and wherein the sealing bead is formed as a soft, resiliently deformable core, located outwardly of the tape-enclosed rod, and a strip of impervious material enclosing said core and said tape-enclosed rod, and bonded to the opposite faces of the sheet material inwardly of the edges of the tape.

11. An internal wing tank installation for airplanes, to contain fuel or the like, comprising, in combination, a plurality of airplane wing bulkheads extending chordwise of the wing, a plurality of aligned tubular tank sections, each of a length to extend from one bulkhead to the next, the terminal sections being closed at their outer ends and the intermediate sections being open-ended, and all being formed of liquid-proof, pliant sheet material, each being located between bulkheads with the edge or edges, as the case may be, of its wall adjacent a corresponding bulkhead, each bulkhead being formed with an open groove extending continuously around and located to receive such edge of each tank section, and directed generally in extension of the wall of such tank section, a first bead along each such edge of the tank section and a separate second bead spaced inwardly of the first bead and also extending along each such edge of the tank section, both entered within the corresponding groove, one bead being of hard substantially incompressible material and the other being of soft resiliently deformable material, a filler bar entered within and extending along the groove alongside the beads, and engaged with the outer side of the hard bead to resist pulling it out of the groove, and with the soft bead to deform the same within the groove for sealing, and removable means reacting between the bulkhead and the filler bar to retain said filler bar in such bead-engaging position within the groove.

12. An internal wing tank installation as in claim 11, wherein the outer first bead is the soft one, and the inner second bead is the hard one, the filler bar having a flange overlying the inner side of the hard bead to resist tension in the tank wall, and the soft outer bead being thereby relieved of tensional forces.

13. An internal wing tank installation as in claim 11, wherein the soft outer bead is of a thickness approximating the width of the groove, and the hard inner bead is of less thickness than the groove's width, the filler bar being of a thickness, outside its flange, approximating the difference between the thickness of the hard bead and the width of the tank, and of a width to extend alongside and to flatten the soft bead adjacent the bottom of the groove.

14. An internal wing tank installation as in claim 11, wherein a flange outstanding from the bulkhead defines one wall of the groove, said flange being recessed along its groove-forming face, immediately outwardly of the filler bar, and shouldered along its opposite face, and a plurality of spring clips each terminating in a foot engaged within said recess and another foot engaged behind said shoulder, said clips being distributed along the flange to retain the filler bar removably within its groove.

15. In combination with a support structure formed with a substantially continuous groove, a pliant sheet, such as an internal wing fuel tank section, for securement by its one edge to said support, a first bead of relatively soft, resiliently deformable material extending along and integral with such edge, a second bead of relatively hard and nondeformable material extending along and integral with such edge, parallel to the softer bead, both said beads being received within and extending the length of the groove in said support structure, a filler bar of substantially noncompressible material also received in said groove, the filler bar being of a size and cross-sectional shape, with relation to the size of the two beads and of the groove, filling the width of the groove alongside the harder bead, and crowding and deforming the softer sealing bead, said filler bar having a longitudinally extending flange located, by the bar's reception within the groove, in contact with the outer side of the harder bead, preventing withdrawal thereof, and means mounted upon the support structure and removably engaged with the filler bar, retaining it in such engagement with the beads and within the groove.

16. A multibay internal airplane wing liquid storage tank installation comprising, in combination, a wing rib structure dividing the wing spanwise into separate interior bays adjoining opposite sides of said rib structure, a rigid projection carried by and extending substantially continuously around the entire outer periphery of said rib structure, in conformity with the cross-sectional shape of the tank at such rib structure, on at least one side of the latter, a collapsible liquid storage tank bag section having walls of flexible material received conformably within such interior bay and having an open end, a securing bead of substantially incompressible material, of a thickness materially in excess of the thickness of the adjoining tank section wall, integral with and extending continuously around such open end, adjoining said rib structure and disposed in substantially continuous contact with said rigid projection, reaction means attached to and supported on the same side of said rib structure and extending substantially continuously in parallelism with and throughout the extent of said rigid projection, and retaining means engaging and reacting from said reaction means towards said rigid projection, and towards the intervening tank section wall inwardly of said bead, to contact the inner side of said bead and retentively to hold the latter from disengagement with the rigid projection.

17. The combination of claim 16, including a second bead of resiliently deformable material, also of a thickness exceeding the thickness of the adjoining tank section wall, paralleling the first bead in closely adjacent relationship, and likewise disposed in substantially continuous contact with the rigid projection and contacted substantially continuously throughout its length by said retaining means, the latter being shaped in its portion that contacts the deformable bead, to deform the latter between the rigid projection and the retaining means, as the latter is operatively positioned by the reaction means.

References Cited in the file of this patent

UNITED STATES PATENTS

| | | |
|---|---|---|
| 1,561,877 | Martin | Nov. 17, 1925 |
| 1,758,720 | Sodergren | May 13, 1930 |
| 2,335,361 | Schiller | Nov. 30, 1943 |
| 2,397,184 | Klose | Mar. 26, 1946 |
| 2,477,697 | Kremer et al. | Aug. 2, 1949 |
| 2,616,509 | Thomas | Nov. 4, 1952 |